Figure 1:
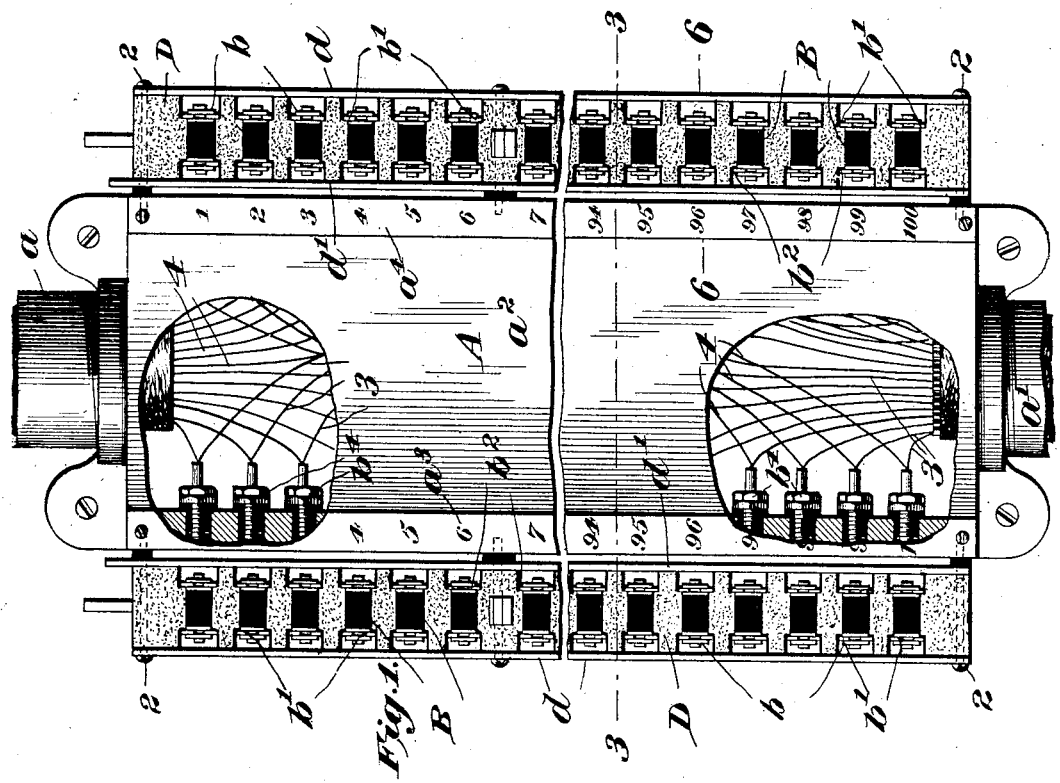

No. 707,049. Patented Aug. 12, 1902.
F. B. COOK.
TERMINAL BOX FOR PROTECTED ELECTRICAL CIRCUITS.
(Application filed May 21, 1902.)
(No Model.) 2 Sheets—Sheet 1.

Witnesses
Elmer Leavey
Arthur F. Durand

Inventor
Frank B. Cook
By Chas. C. Bulkley.
Attorney

No. 707,049. Patented Aug. 12, 1902.
F. B. COOK.
TERMINAL BOX FOR PROTECTED ELECTRICAL CIRCUITS.
(Application filed May 21, 1902.)
(No Model.) 2 Sheets—Sheet 2.
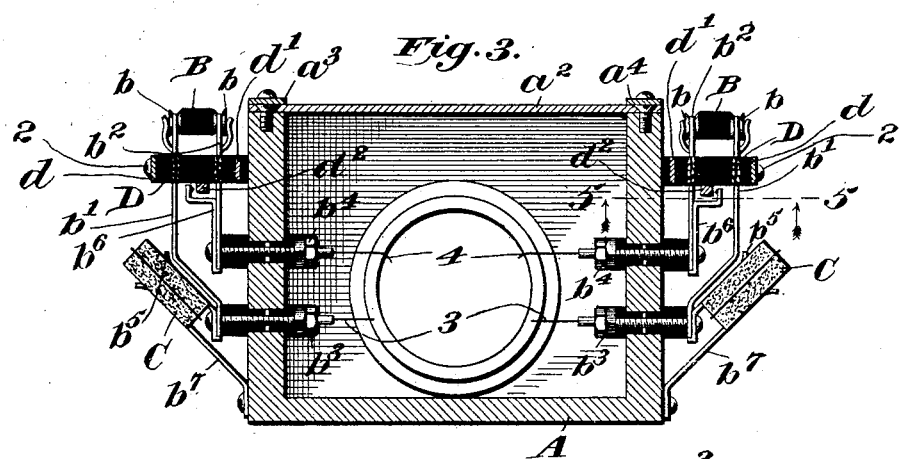
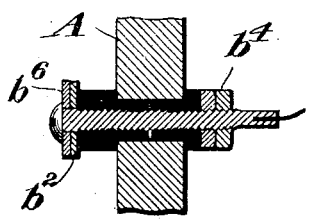
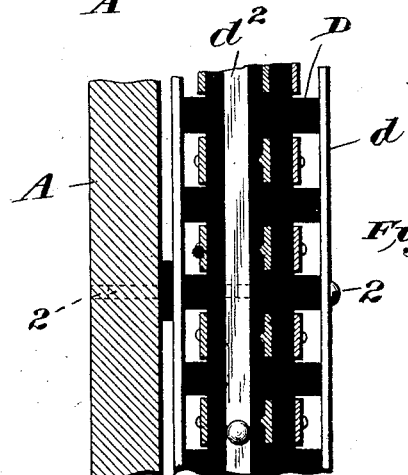
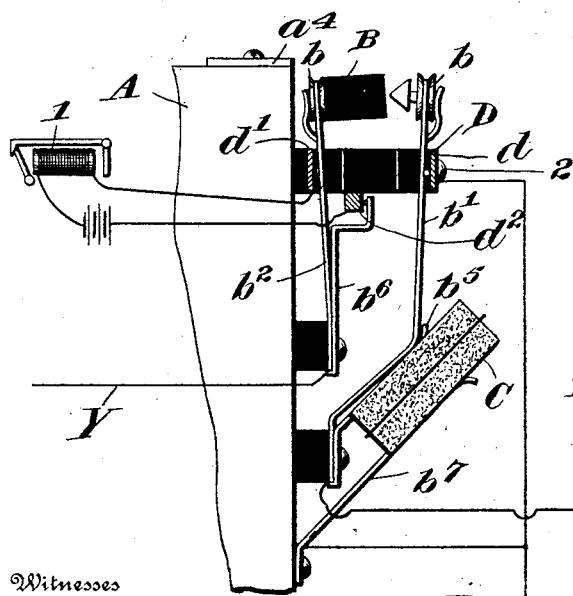
Witnesses
Elmer Seavey
Arthur F. Durand
Inventor
Frank B. Cook
By Chas. C. Bulkley
Attorney

UNITED STATES PATENT OFFICE.

FRANK B. COOK, OF CHICAGO, ILLINOIS.

TERMINAL BOX FOR PROTECTED ELECTRICAL CIRCUITS.

SPECIFICATION forming part of Letters Patent No. 707,049, dated August 12, 1902.

Original application filed July 29, 1896, Serial No. 600,970. Divided and this application filed May 21, 1902. Serial No. 108,328. (No model.)

*To all whom it may concern:*

Be it known that I, FRANK B. COOK, a citizen of the United States of America, and a resident of Chicago, Cook county, Illinois, have invented a certain new and useful Improvement in Terminal Boxes for Protected Electrical Circuits, of which the following is a specification.

This is a division of my application, Serial No. 600,970, filed July 29, 1896. In said application I have described and claimed a thermal protector for use in various connections, such as telephone and telegraph systems. In the present application I have described and claimed a terminal box upon which are mounted a number of these thermal protectors. These terminal boxes are adapted for use in telephone or telegraph systems, and each box constitutes the junction between a number of line wires or conductors and the conductors leading to the switchboard. In this way each thermal protector involved in the construction of the terminal box forms part of the line-circuit and serves as medium of electrical connection between a line conductor and a conductor leading to the switchboard. The arrangement also involves a number of carbon lightning-arresters which correspond in number to the thermal protectors and which are arranged in conjunction with the latter for protecting the various instruments or devices involved in the circuits.

Generally stated, the object of my invention is to provide a simple, inexpensive, and readily-accessible terminal box adapted to serve as a support for a number of thermal protectors and carbon lightning-arresters and adapted to form a junction or medium of electrical connection between a number of line conductors and a corresponding number of switchboard-conductors.

A special object is to provide a construction and arrangement of terminal box whereby a signaling device can be employed to give a signal whenever one of the thermal protectors is operated or disrupted by the passage of an abnormally large current.

Another object is to provide a construction and arrangement whereby the various connections may be made in a convenient and efficient manner.

It is also an object to provide certain details and features of improvements tending to increase the general efficiency and serviceability of a device of this character.

To the foregoing and other useful ends my invention consists in matters hereinafter set forth and claimed.

Figure 2:
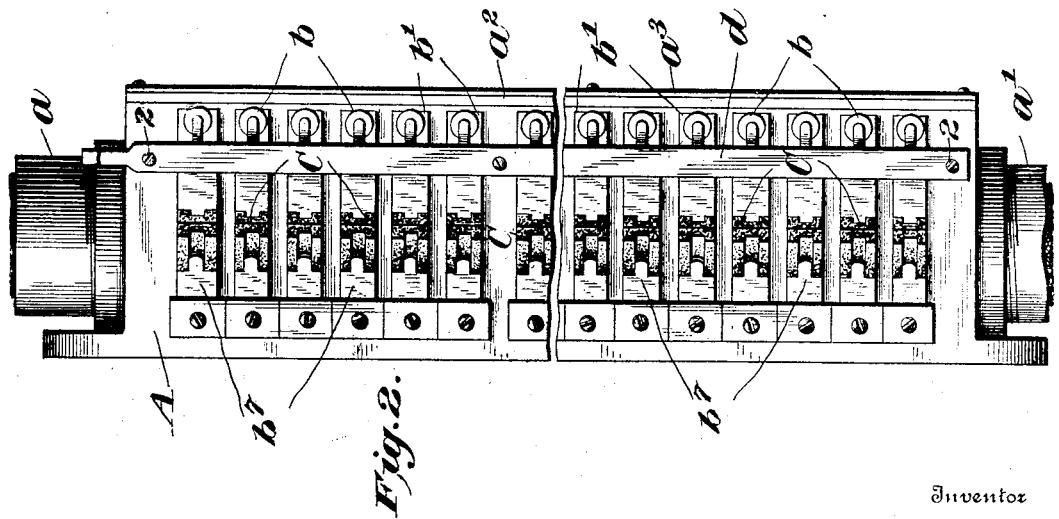

In the accompanying drawings, Figure 1 is a plan of a terminal box for use in telephone or other like systems. In this view one portion of the box is broken away to expose the switchboard-conductors and their connections with the thermal protectors, and another portion is broken away to expose the line conductors and their connections with the said protectors. Fig. 2 is a side elevation of the terminal box shown in Fig. 1. Fig. 3 is a cross-section on line 3 3 in Fig. 1. Fig. 4 is an enlarged detail sectional view of one of the binding-post devices employed for securing the thermal protectors and lightning-arresters to the box. Fig. 5 is a horizontal section on line 5 5 in Fig. 3 looking in the direction indicated by the arrows. Fig. 6 is an enlarged detail view, more or less diagrammatic in character, showing one of the thermal protectors as having been disrupted or operated by the passage of an abnormally large current and showing the various circuit connections.

As thus illustrated my invention comprises a box or inclosure A, which is preferably rectangular in form and of some length and which is also preferably provided at its opposite ends with the bosses or tubular portions $a$ and $a'$, adapted to provide openings respectively for the switchboard and line conductors. The top of the box preferably consists of a lid or cover $a^2$, adapted to be secured in place by screws, substantially in the manner shown in Fig. 3. The metal strips $a^3$ and $a^4$ are preferably secured along each side of this cover and can be provided with indicating members or numerals, as shown in Fig. 1 and as will hereinafter more fully appear. The thermal protectors employed are arranged in two rows or series at each side of the box. Each thermal protector consists, preferably, of a heat-coil B, having heads $b$, adapted to engage notches or openings in the upper ends of the springs $b'$ and $b^2$. These springs, it will be observed, are secured to the side of the box by the binding-posts $b^3$ and $b^4$. The binding-post $b^3$ is also adapted to support the spring-jaw $b^5$, while the binding-post $b^4$ is adapted to support the arm or spring member $b^6$. A second jaw $b^7$ is arranged to oppose the jaw $b^5$, and the carbon blocks of the lightning-arrester C are held firmly between these two jaws. It will be seen that both the binding-post devices are thoroughly insulated and that a dielectric or strip of insulation is arranged between the two carbon blocks of the lightning-arrester. The springs $b'$ and $b^2$ are adapted to project upwardly through a long strip of insulation D, which is mounted upon the side of the box. By referring to Figs. 1 and 5 it will be seen that this strip of insulation is provided with a number of openings to permit the proper amount of play or movement on the part of said springs. It will also be seen that a metal strip $d$ is secured to the outer edge of this strip of insulation and that a similar strip $d'$ is secured to the inner edge thereof. This construction is duplicated at each side of the box, as shown in Figs. 1 and 3, each lightning-arrester being arranged to serve in conjunction with a heat-coil or thermal protector device and each combined heat-coil and lightning-arrester being secured to the side of the box by a pair of binding-posts. By referring to Figs. 3 and 5 it will also be seen that each strip of insulation D is provided at its under side with a metal strip $d^2$. The line-wires can be arranged in the usual cable form and can be spread out and distributed through the interior of the box, so as to permit their ends to be soldered or united to the line binding-posts $b^3$. The switchboard-conductors can be led in a similar manner through the opening in the opposite end of the box and can have their end portions united to the switchboard binding-posts $b^4$. Thus each heat-coil or thermal protector is located in a line-circuit and is arranged to respond to the action of excessive current for the purpose of disrupting the circuit. The circuit arrangement is shown in Fig. 6. In this view it will be seen that the line conductor X is connected with the springs $b'$ and $b^5$ and that the switchboard-conductor Y is connected with the springs $b^2$ and $b^6$. The spring $b^7$ and also the metal strip $d$ are both preferably grounded at Z. The metal strip $d'$ and the bar $d^2$ can be connected with the visual indicator 1. With this arrangement and as shown in said Fig. 6 the passage of an abnormally large current over the line will cause the heat-coil to release the springs upon which it is supported. The spring $b'$ in engaging the strip $d$ establishes connection between the line and the ground. The springs $b^6$ and $b^2$, engaging the strips of metal $d'$ and $d^2$, close the normally open circuit, including the visual indicator 1. Thus the heat-coil when operated not only disrupts the circuit and establishes connection between the line and the ground, but also operates to close a local circuit through the signaling device. It will also be seen that lightning discharges can pass from the line through the carbon blocks and thence to the ground. If the high-potential current is only of a transient character, the momentary arcing will only pierce the dielectric between the two carbon blocks, allowing the current to pass to earth. However, should the current be of some duration then the arcing will burn away the dielectric, thereby allowing the carbons to come together, so as to establish a positive connection or conducting-path to earth. In this way any of the heat-coils shown are capable of producing a gap in one of the line-circuits and of simultaneously therewith establishing connection with the ground. Furthermore, as explained, the operation of any one of the heat-coils is accompanied by a signal or alarm. In this way the attendant can readily and quickly locate a thermal protector as soon as it is operated. Each heat-coil is readily removable from the springs upon which it is supported. The construction of these heat-coils is described and claimed in my aforesaid original application. For this reason and for the further reason that these devices are well known in the art I have not shown and described any special form or construction. In fact, the thermal protectors shown and described can be of any suitable form or construction.

The box A can be of any suitable material. For example and in order to simplify the circuit connections, it may be constructed of cast-iron or other metal. In this way the grounded connection or circuit can include the box. The contact-strips $d$ can be secured to the box by means of screws 2. The spring-jaws $b^7$ of the lightning-arresters are, as explained, preferably secured directly to the box, as shown. Thus the box can be grounded, and lightning discharges will jump to the ground through the metal of the box. This will also be the case with respect to excessive currents, the thermal protectors when operated establishing connection with the ground through either one of the strips $d$ and thence through the screws 2 and the box to the grounded conductor. As shown, the binding-posts $b^3$ and $b^4$ are, like the box, made of metal and are preferably insulated and arranged in rows or series. Line-wires 3, passing in at one end of the box, preferably connect with the lower rows or series of binding-posts, while the switchboard-wires 4, passing in at the other end of the box, connect with the upper rows or series. This facilitates the making of connections and the repair of the various devices. The numerals or numbers on the strips $a^3$ and $a^4$ may correspond to the number of thermal protectors employed.

I claim as my invention—

1. A combined cable terminal and protector, comprising a suitable box, a plurality of thermal protectors arranged at each side of the box, a pair of metal strips whereby the thermal protectors are each operative to establish connection to the ground, carbon lightning-arresters arranged in conjunction with said thermal protectors, and binding-posts arranged inside of said box and extending through the walls thereof, the outer ends of said binding-posts being connected with said thermal protectors and lightning-arresters.

2. A combined cable terminal and protector, comprising a suitable box, binding-posts arranged inside of said box and extending through the walls thereof, a removable cover for said box, a plurality of heat-coils, a plurality of spring-switches upon which said heat-coils are supported, a plurality of metal strips whereby each spring-switch, when released by a heat-coil, is capable of establishing connection with the ground, and a plurality of carbon lightning-arresters associated with said heat-coils.

3. A combined cable terminal and protector, comprising a suitable box, binding-posts arranged within said box and extending through the walls thereof, said binding-posts being arranged in upper and lower rows, line-springs mounted upon the binding-posts in the lower rows, switchboard-conductor springs mounted upon the binding-posts in the upper rows, each line-spring being arranged to oppose a switchboard-conductor spring, heat-coils arranged to hold said springs under tension, metal strips arranged to serve as stops for limiting the movement of said line-springs, said metal strips being adapted to be connected to earth, spring-jaws mounted upon the binding-posts in the lower rows, other spring-jaws opposing those thus mounted, and carbon blocks with interposed insulation mounted between said jaws.

4. A combined cable terminal and protector, comprising a suitable box, a plurality of thermal protectors mounted at each side of said box, each thermal protector when operated by the passage of an abnormally large current being adapted to produce a gap in the circuit and establish connection with the ground, a carbon lightning-arrester associated with said thermal protectors, and also adapted to be connected with the ground.

5. A combined cable terminal and protector, comprising a metal box adapted to be connected with a grounded conductor, a plurality of thermal protectors arranged in parallel rows at opposite sides of said box, insulated binding-posts extending through the walls of the box and connected with said thermal protectors, line-wires leading through one end of the box and connected with a number of said binding-posts, switchboard-wires leading through the other end of the box and connected with the remaining binding-posts, each thermal protector being operative to break a circuit and simultaneously therewith establish connection with the ground through said box, and carbon lightning-arresters associated with said protectors and connected to allow lightning-discharges to jump to ground through said box.

6. A combined cable terminal and protector, comprising a metal box, a plurality of thermal protectors mounted upon said box, a grounded conductor connected with said box, insulated binding-posts extending through the walls of said box and connected with said thermal protectors, line-wires connected with part of said binding-posts, switchboard-wires connected with the remaining binding-posts, each thermal protector being operative to produce a gap in a circuit when operated by the passage of an abnormally large current, and spring switch devices adapted to establish connection between the line-wires and the said metal box.

7. A combined cable terminal and protector, comprising a metal box adapted to be connected with the earth, spring-jaws arranged in pairs and suitably mounted upon said box, a removable heat-coil device mounted upon each pair of jaws, suitable connections for including each heat-coil and its pair of jaws serially in a circuit, insulated binding-posts extending through the walls of said box and connected with said jaws, line-wires leading through one end of the box and connected with a number of said binding-posts, switchboard-wires leading through the other end of the box and connected with the remaining binding-posts, and contacts whereby certain of said spring-jaws, when released by the heat-coils, establish connection with the ground through said box.

8. A protective apparatus for telephone and telegraph systems, consisting of a terminal box, a plurality of quantitative protectors mounted on the exterior of the box, conductors entering into and passing out from the interior of said box, terminal holders and terminal conductors connecting the interior conductors with the exterior quantitative protectors, and a plurality of intensity-protectors also mounted on said box, together with conducting-strips, and spring contact-strips, also mounted on said box but each insulated from the others, the conducting-strips being adapted to be respectively connected to a ground-circuit and a signal-circuit, the spring contact-strips being normally disconnected from the conducting-strips.

9. A protective apparatus for telephone and telegraph systems consisting of a terminal box, a plurality of quantitative protectors mounted on the exterior of the box, spring-contacts for said quantitative protectors, a guiding and holding plate for said spring-contacts which is secured to the side of the terminal box, conductors entering into and passing through the interior of said box, terminal holders and terminal conductors connecting the interior conductors with the exterior quantitative protectors and a plurality of intensity-protectors also mounted on said box, which latter is connected with the ground, together with a conducting-strip attached to the guiding and holding plate, which conducting-strip is connected to ground, and two other conducting-strips also attached to the guiding and holding plate, which latter conducting-strips are connected to a signal-circuit.

10. The combination of a support, switch-springs mounted in pairs at each side of said support, a heat-coil mounted upon each pair of switch-springs, means for connecting one spring of each pair with a line conductor, suitable connections whereby each line-spring when released establishes connection between a line conductor and the ground, means for connecting the other spring of each pair with a switchboard-conductor, a pair of metal strips arranged at each side of said support, each pair of metal strips being adapted to be included in a signal-circuit, and means whereby each switchboard-spring when released operates to connect the two members of one of said pairs of metal strips.

11. The combination of a support, a pair of metal strips mounted at each side of said support, each pair of metal strips being adapted to be included in a signal-circuit, thermal protectors arranged in parallel rows at opposite sides of said support, each thermal protector being provided with means for establishing electrical connection between the members of the adjacent pair of metal strips, and means for grounding said support, each thermal protector being also provided with means for establishing connection between a line conductor and said grounded support.

12. The combination of a metal support, a pair of insulated metal strips adapted to be included in a signal-circuit, a plurality of heat-coil-protecting devices arranged in a row along said strips, each of said protecting devices being provided with means for establishing electrical connection between said strips and also with means for establishing connection between a line conductor and said support.

13. The combination of a suitable support, a pair of insulated metal strips adapted to be included in a signal-circuit, line and switchboard springs arranged in pairs along said strips, a heat-coil removably mounted on each pair of springs, each switchboard-spring being provided with means for establishing electrical connection between said strips, and each line-spring being provided with means for establishing connection between a line conductor and a grounded conducter.

14. The combination of a support, a strip of insulation mounted at each side of said support, a pair of metal strips extending lengthwise of each strip of insulation, line and switchboard springs arranged in a row along each strip of insulation, a heat-coil removably mounted on each pair of springs, each switchboard-spring being associated with means for establishing electrical connection between the two adjacent metal strips.

15. The combination of a grounded member, a plurality of carbon lightning-arresters supported by said member, heat-coil-protecting devices arranged in two parallel rows on opposite sides of said support, each heat-coil device being arranged opposite a carbon lightning-arrester, line conductors and switchboard-conductors, each thermal protector when operated establishing connection between a line conductor and said grounded member, means for including each line conductor serially in circuit with a carbon lightning-arrester and said grounded member, a pair of metal strips associated with each row of heat-coil-protecting devices, each pair of metal strips being adapted to be included in a signal-circuit, and each protecting device being provided with means for establishing electrical connection between the members of the adjacent pair of metal strips.

Signed by me at Chicago, Cook county, Illinois, this 14th day of May, 1902.

FRANK B. COOK.

Witnesses:
ARTHUR F. DURAND,
HARRY P. BAUMGARTNER.